(12) United States Patent
Poncet

(10) Patent No.: US 6,801,810 B1
(45) Date of Patent: Oct. 5, 2004

(54) METHOD AND DEVICE FOR STATE ESTIMATION

(75) Inventor: Andreas Poncet, Zürich (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/563,205

(22) Filed: May 2, 2000

(30) Foreign Application Priority Data

May 14, 1999 (EP) ............................................. 99810428

(51) Int. Cl.[7] ............................................. G05B 11/01
(52) U.S. Cl. ............................ 700/12; 700/13; 700/28; 700/29; 700/44; 700/48; 700/93; 706/21
(58) Field of Search .............................. 700/44, 48, 12, 700/13, 28, 29, 93; 706/21

(56) References Cited

U.S. PATENT DOCUMENTS

| | | | |
|---|---|---|---|
| 3,805,032 A | | 4/1974 | Ross |
| 4,893,262 A | | 1/1990 | Kalata |
| 5,369,345 A | | 11/1994 | Phan et al. |
| 5,406,488 A | * | 4/1995 | Booth ........................ 244/194 |
| 5,682,309 A | | 10/1997 | Bartusiak et al. |
| 5,933,345 A | * | 8/1999 | Martin et al. .................. 700/29 |
| 6,285,971 B1 | * | 9/2001 | Shah et al. .................... 700/38 |

FOREIGN PATENT DOCUMENTS

EP         0 800 125 A1    10/1997

OTHER PUBLICATIONS

Daruach, et al., "Recursive State Estimation for Linear Dynamic Systems Under Algebraic Constraints," Electronic Letters, vol. 27, No. 10, May 9, 1991, pp. 803–804.

V.M. Kurkin, "Algorithm for Adaptive Estimation of the Load in a Computer System," Automatic Control and Computer Sciences, vol. 18, No. 4, 1984, pp. 1–7.

M. Zasadzinski, et al., "Estimation de L'Etat Pour Une Classe de Systems Singuliers. Application ALA Validation de Donnees," Automatique–Productique Informatique Industrielle, vol. 26., No. 2, 1992, pp. 107–124.

Alexandros Kretsovalis, et al., "Effect of Redunancy on Estimation Accuracy in Process Data Reconciliation," Chemical Engineering Science, vol. 42, No. 9, 1987, pp. 2115–2121.

Peter D. Hanlon, et al., "Characterization of Kalman Filter Residuals in the Presence of Mismodeling," Proceedings of the 37th Conference on Decision and Control, vol. 2, Dec. 1998, pp. 1254–1259.

Y. Moon, et al., "Design of Reliable Measurement System for State Estimation," IEEE Transactions on Power Systems, vol. 3, No. 3, Aug. 1988, pp. 830–836.

S. Bousghiri–Kratz, et al., "Fault Detection Using State Estimation. Application to an Electromechanical Process," Proceedings of the 34th Conference on Decision and Control, vol. 3, Dec. 1995, pp. 2397–2402.

Cameron M. Crowe, "Data Reconciliation—Progress and Challenges," J. Proc. Cont., vol. 6, No. 2/3, 1996, pp. 89–98.

\* cited by examiner

*Primary Examiner*—Ramesh Patel
*Assistant Examiner*—Thomas Pham
(74) *Attorney, Agent, or Firm*—Oblon, Spivak, McClelland, Maier & Neustadt, P.C.

(57) ABSTRACT

A method for estimating a state of a system including determining, during a current cycle of the system, an estimated state of the system based on currently measured values of the system, boundary conditions of the system, an accuracy of the currently measured values, and an estimated state from a preceding cycle. The method also determines an accuracy of the estimated state, and determines an uncertainty of the estimated state based on the estimated state and the accuracy of the estimated state.

29 Claims, 2 Drawing Sheets

METHOD AND DEVICE FOR STATE ESTIMATION

BACKGROUND OF THE INVENTION

1. Field of the Invention

The invention relates to the field of control engineering. It relates to a method and device for estimating a state of a system.

2. Discussion of the Background

Tracking the temporal performance of a technical system, for example a production plant, a power plant or an electromechanical device, requires continuous determination of system variables, for example temperatures, pressures, mass flows, outputs. With the aid of such variables and with the aid of values of control inputs, the system can be controlled and the future performance of the system can be predicted, optimized and held within safe limits.

The measurement of all the required system variables is, however, neither possible nor expedient in technical or economic terms. Consequently, specific system variables have to be estimated with the aid of measurements of other variables. All estimates are affected by random errors because of measuring noise, variations in the sensors and non-observed disturbances. Tracking and predicting system performance, and regulating and controlling the system are based on these faulty estimates.

System variables are generally estimated using a Kalman filter. If the system has linear dynamics, the filter determines from the measurements a point in the space of the system variables. However, since the physical laws acting in the system, for example the laws of conservation of mass and energy, are not all linear, they are not obeyed by the estimate of the filter. Consequently, the estimates are not of adequate quality for accurate monitoring.

For this reason, methods exist or coordinating measured data, also termed data reconciliation methods, which ensure that at least the measured data obey prescribed physical laws or satisfy boundary conditions.

The term "state" is not used below in the narrower sense of dynamic system theory, that is to say not only for the minimum information for describing the temporal system performance, but in the wider sense for all system variables which are of interest.

Thus, the aim is to determine a value x of a d-dimensional state vector X of a system. The information contained in this state is usually redundant because of physical relationships in the system. This redundancy corresponds to a set of boundary conditions corresponding to the c-dimensional equation $$g(x)=0. \quad (1)$$

Let a measurement Y of the state X be disturbed by an instance of independent additive noise W. The latter represents sensor noise, for example. These relationships are reproduced by FIG. 1. Thus, it holds that $$Y=X+W \quad (2)$$

Here and below, upper-case letters W, X, Y denote random vectors, that is to say vectors of random variables, while lower-case letters w, x, y denote values which these random vectors assume.

Because of the boundary conditions (1), the prior probability density of X satisfies $$p_x(x) \propto \delta(g(x)),$$

where $\delta(\cdot)$ is the Dirac distribution. Furthermore, because X and W have been assumed to be independent, the likelihood function is $$p_{y|x}(y|x)=p_w(y-x), \quad (3)$$

where $P_w(\cdot)$ is the probability density of the measuring noise. Given a measurement, in the a posteriori probability density of X in accordance with Bayes theorem in which the random variable Y assumes a value y, that is to say that Y=y, is given by $$P_{X|Y}(x|y) = \frac{p_x(x)p_w(y-x)}{\int_{-\infty}^{\infty} p_x(x)p_w(y-x)\,dx}. \quad (4)$$

Given that Y=y, the maximum a posteriori (MAP) estimate, that is to say the most probable value of X is therefore $$\hat{x}_{MAP}(y) \triangleq \underset{\{x|g(x)=0\}}{\arg\max} p_x(x)p_w(y-x) \quad (5)$$

$$= \underset{\{x|g(x)=0\}}{\arg\min} -\log p_x(x) - \log p_w(y-x)$$

For example, let the measurement be modeled by additive Gaussian noise with a mean value of zero and non-correlated components, that is to say $$W \sim N(0;\Sigma_w), \quad (6)$$

The covariance matrix being equal to $$\Sigma_w = \text{diag}(\sigma_1^2, \ldots, \sigma_m^2) \quad (7)$$

Assuming a constant prior density (uninformative prior) $p_x(\cdot)$ for X, (5) yields the maximum likelihood (ML) estimate, $\hat{x}_{ML}(y)$ as solution of $$\min_x (y-x)^T \Sigma_w^{-1} (y-x) = \min_x \sum_{i=1}^{m} (y_i - x_i)^2 / \sigma_i^2 \quad (8)$$

under the boundary condition that $$g(x)=0. \quad (9)$$

This corresponds to the classical data reconciliation method such as is known, for example, from the article "Data Reconciliation, Progress and Challenge"; Cameron M. Crowe; J. Proc. Cont. Vol. 6, No. 2/3, pp. 89–98, 1996; Elsevier Science Ltd. The quality of the method is inadequate for certain applications.

SUMMARY OF THE INVENTION

It is therefore the object of the invention to create a method and a device of the type mentioned at the beginning which remove the above-mentioned disadvantages.

In the method according to the invention, after a measurement a state of a technical system is estimated with the aid of new measured data from the system, from a measure of the accuracy of the measured data and from physical boundary conditions. In this case, a preferably immediately preceding state, a measure of its accuracy and a dynamic model of the system are also taken into account, and a measure of the accuracy of the newly estimated state is determined.

The method according to the invention renders it possible to incorporate not only the static physical boundary conditions, but also their dynamic development. Consequently, the accuracy of the estimated state and the quality of regulation or control based thereon are enhanced. For example, the robustness of an estimate with respect to noise-induced and other outliers is substantially enhanced. Such an outlier would cause a false estimated value $\hat{x}_{ML}(y)$ in the case of conventional methods.

A system is to be understood as a technical process of arbitrary type, for example a plant used in production engineering, an electromechanical device or a power plant, in particular a thermal power plant for generating electric energy.

Here and below the term "state" is not used in the narrower sense of dynamic system theory, that is to say it is used not only for the minimum information for describing the temporal system performance, but in the wider sense for all system variables which are of interest. For the sake of simplicity, the term "accuracy" is used at some junctures instead of the term "measure of accuracy".

In a preferred variant of the method according to the invention, the accuracy of the system variables is used to determine their uncertainty, for example in the form of probability intervals, and account is taken of this in regulating the system. Consequently, expected operating costs can be determined and optimized continuously and comprehensively. In particular, operating risks can be reduced, for example by taking account of the uncertainty of a critical system variable when this variable must be kept in a specific range.

A device according to the invention has a means for estimating state variables under boundary conditions, a means for predicting state variables, a means for estimating accuracies and a means for estimating an accuracy of predictions.

A preferred embodiment of the device according to the invention further has means for determining uncertainties and means for optimizing and regulating the performance of the system.

The invention is explained in more detail below with the aid of a preferred exemplary embodiment which is illustrated in the attached drawings, in which:

FIG. 1 shows a measuring model structure in accordance with the prior arts;

FIG. 2 shows a system model structure in accordance with the invention;

FIG. 3 shows a device according to the invention;

FIG. 4 shows an estimator unit of the device according to the invention; and

FIG. 5 shows a control unit of the device according to the invention.

BRIEF DESCRIPTION OF THE DRAWINGS

The reference symbols used in the drawings and their meaning are listed in summary in the list of reference symbols. In principle, identical elements are provided in the figures with identical reference symbols.

For the purpose of better comprehension of the exemplary embodiments, the inventive method is first described in general terms with the aid of its theoretical derivation.

It is firstly shown how the state of a system is estimated. Subsequently, it is shown how the calculations are simplified by linearization and by applying the matrix inverse lemma.

In the method in accordance with the prior art, a state of a system is determined at a specific instant, for example in an equilibrium state. It has been assumed in so doing that the measurement was performed at the same instant. Consideration is given here to the weighty problem of estimating a time-variant d-dimensional state $X_k$ at a kth instant at which the state of a time-discrete system is being considered, earlier manipulated variables $U_0, \ldots, U_{k-1}$ and measured values $Y_0, \ldots, Y_k$ being known. This corresponds for the time being to the task of a Kalman filter, it being additionally necessary, however, also to satisfy boundary conditions for the states, and to determine the accuracy of the estimate. The entire conditioned probability distribution of $X_k$ therefore has to be determined.

Figure 1:
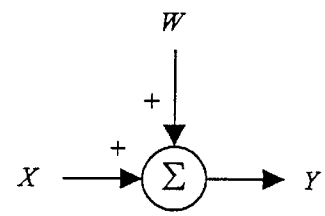
Figure 2:
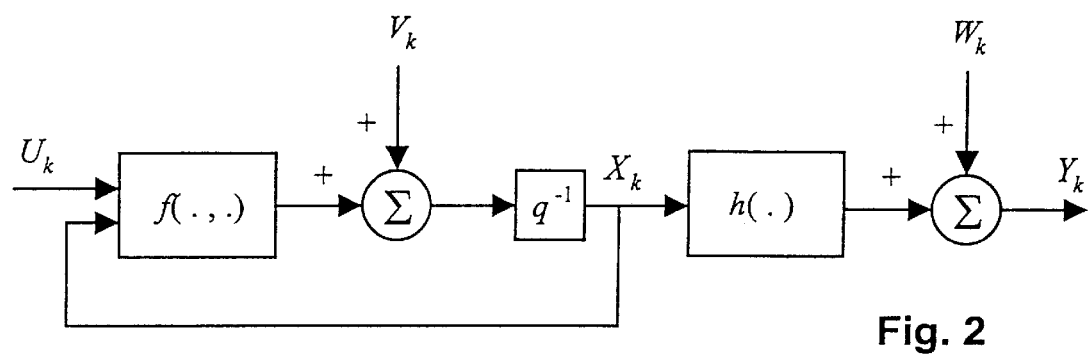

FIG. 2 shows a mathematical model of a system, also termed a controlled system, which is fundamental to the method. Influences on the state from non-measurable disturbances, in particular, are modeled therein. The model simulates disturbances which change slowly relative to the inherent system dynamics. This is performed by means of a Markov process $\{X_k\}$ which is driven by additive independent noise or process noise $\{V_k\}$ and is controlled by an actuating signal $\{U_k\}$.

The state runs for $k=0,1,2,\ldots$ in accordance with $$X_{k+1}=f(X_k, U_k)+V_k \tag{10}$$

under the boundary condition that $$g(X_k)=0, \tag{11}$$

which, for example, represents physical conservation laws of the system. Furthermore, let $h(X_k)$ be a non-noisy m-dimensional output of the system. Let a measurement $Y_k$ of the output be disturbed by an instance of independent additive noise $W_k$ which is independent of $X_j$ and $V_j$ for all k and all j. This represents sensor noise, for example. Consequently, $$Y_k=h(X_k)+W_k. \tag{12}$$

In the classical Kalman filter, f and h are linear mappings, and the mapping g does not exist. The Kalman filter usually assumes that the statistical properties of the process noise and the measuring noise are time invariant.

According to the invention, the state is estimated in the following way: an arbitrary instant k is considered. The conditioned probability distribution of $X_k$ is now determined, given the manipulated variable sequence $U_0, \ldots, U_{k-1}$, the measured value sequence $Y_0, \ldots, Y_k$ and the boundary condition (11). In addition to an estimated value $\hat{X}_k$, that is to say a point in the state space, the uncertainty of the estimated value is also determined. Since the estimation is to be done on line, a recursive solution is developed.

In accordance with the theorem of total probability, the distribution of $X_k$ before the measurement $Y_k$ is given by $$p_{x_k|y_0\ldots y_{k-1}}(x_k | y_0, \ldots, y_{k-1}) = \int_{-\infty}^{\infty} p_{x_{k-1}|y_0\ldots y_{k-1}}(x_{k-1} | y_0, \ldots, y_{k-1})$$

$$p_{x_k|x_{k-1}y_0\ldots y_{k-1}}(x_k | x_{k-1}, y_0, \ldots, y_{k-1})dx_{k-1}$$

and is proportional to a $\delta(g(x_k))$ because of the boundary conditions. Since the manipulated variable sequence $\{U_k\}$ is known, all the probabilities shown are also conditioned with reference to the manipulated variable sequence. However, for the sake of simplicity this is not noted in every expression.

Since $\{X_k\}$ is a controlled Markov process, it holds that $$p_{x_k\ldots x_k|x_{k-1}y_0,\ldots,y_{k-1}}(x_k|x_{k-1},y_0,\ldots,y_{k-1})=p_{x_k|x_{k-1}}(x_k|x_{k-1})=$$
$$P_v(x_k-f(x_{k-1},u_{k-1})), \tag{13}$$

the second equality following from the addition of the state disturbance $V_k$. Consequently, $$p_{x_k|y_0\cdots y_{k-1}}(x_k \mid y_0, \ldots, y_{k-1}) = \quad (14)$$

$$\int_{-\infty}^{\infty} p_{x_{k-1}|y_0\cdots y_{k-1}}(x_{k-1} \mid y_0, \ldots, y_{k-1}) p_v(x_k - f(x_{k-1}, u_{k-1})) \, dx_{k-1}.$$

Because of the assumptions concerning the measuring noise $W_k$, $$p_{Y_k|X_kY_0\ldots Y_{k-1}}(y_k|x_k,y_0,\ldots,y_{k-1}) = p_{Y_k|X_k}(y_k|x_k) = p_w(y_k - h(x_k)). \quad (15)$$

Consequently, the posteriori distribution of $X_k$ is equal to $$p_{x_k|y_0\cdots y_k}(x_k \mid y_0, \ldots, y_k) = \quad (16)$$

$$\frac{p_{x_k|y_0\cdots y_{k-1}}(x_k \mid y_0, \ldots, y_{k-1}) p_w(y_k - h(x_k))}{\int_{-\infty}^{\infty} p_{x_k|y_0\cdots y_{k-1}}(x_k \mid y_0, \ldots, y_{k-1}) p_w(y_k - h(x_k)) \, dx_k}.$$

Finally, the MAP estimation is equal to the solution of $$\min_x -\log p_{x_k|y_0\cdots y_{k-1}}(x \mid y_0, \ldots y_{k-1}) - \log p_w(y_k - h(x)) \quad (17)$$

under the boundary condition that $$g(x)=0. \quad (18)$$

The calculations can be approximated and simplified in the following way: without restricting generality, it can be assumed that $\{W_k\}$ and $\{V_k\}$ have the mean value of zero. It further holds that $$X_k = f(X_{k-1}, U_{k-1}) + V_{k-1} \quad (19)$$

$$E(W_k|Y_0, \ldots, Y_{k-1}) = E(W_k) = 0 \quad (20)$$

$$E(V_k|Y_0, \ldots, Y_{k-1}) = E(V_k) = 0 \quad (21)$$

because of the assumptions concerning the independent nature of $\{W_k\}$ and $\{V_k\}$ for all k>0. For $\bar{x}$ close to $x_{k-1}$, the expression f can be approximated by $$f(x_{k-1}, u_{k-1}) \approx f(\bar{x}, u_{k-1}) + \nabla f(\bar{x}, u_{k-1}) \cdot (x_{k-1} - \bar{x}) \quad (22)$$

and, in particular for $$\bar{x} = E(X_{k-1}|Y_0, \ldots, Y_{k-1}) \hat{=} \hat{X}_{k-1|k-1}. \quad (23)$$

Consequently, in accordance with (19) and (22)

$$\hat{X}_k \approx f(\hat{X}_{k-1|k-1}, U_{k-1}) + A_{k-1}(X_{k-1} - \hat{X}_{k-1|k-1}) + V_{k-1}, \quad (24)$$

the matrix $$A_k \hat{=} \nabla f(\hat{x}_{k|k}, u_k) \quad (25)$$

having been introduced. The expected value of $X_k$ (24), given $Y_0, \ldots, Y_{k-1}$, is yielded from (19), (21) and (23) as $$\hat{X}_{k|k-1} \hat{=} E(X_k|Y_0, \ldots, Y_{k-1}) = E[f(X_{k-1}, U_{k-1})|Y_0, \ldots, Y_{k-1}] = f(\hat{X}_{k-1|k-1}, U_{k-1}). \quad (26)$$

Furthermore, because of (19) and the independence of the process $\{V_k\}$, $$\Sigma_{k|k-1} \hat{=} \text{Cov}(X_k|Y_0, \ldots, Y_{k-1}) = \text{Cov}[f(X_{k-1}, U_{k-1})|Y_0, \ldots, Y_{k-1}] + \Sigma_v.$$

In this case, $\Sigma_{k|k-1}$ is not to be confused with the covariance matrix of the estimate $\hat{X}_{k|k-1}$ that is to say $\text{Cov}(\hat{X}_{k|k-1}|X_k)$. It follows from (24) that $$\Sigma_{k|k-1} \approx A_{k-1} \Sigma_{k-1|k-1} A_{k-1}^T + \Sigma_v. \quad (27)$$

Since $V_{k-1}$ and $X_{k-1}$ are independent, given $Y_0, \ldots, Y_{k-1}$, the probability distribution $X_k$ is essentially given—because of the Taylor approximation (24)—by the convolution of the distribution of $A_{k-1}X_{k-1}$ and $V_{k-1}$. The matrix multiplication corresponds to a summation of stochastic, but not completely independent variables. In addition, the convolution is recursive, that is to say a new convolution is added for each k. It follows from this that the central limit theorem justifies the Gaussian approximation of the prior density $$p_{x_k|Y_0,\ldots,Y_{k-1}}(x_k|y_0,\ldots,y_{k-1}) \approx N(f(\hat{x}_{k-1|k-1}, u_{k-1}); A_{k-1}\Sigma_{k-1|k-1}A_{k-1}^T + \Sigma_v) \quad (28)$$

Note that because of the approximation the Gaussian prior density is not exactly proportional to $\delta(g(x_k))$. When determining the a posteriori density, however, this boundary condition is not taken into account by the minimization under boundary condition (17)–(18).

Let $$C_k \hat{=} \nabla h(\hat{x}_{k|k}) \quad (29)$$

by processing the mapping h corresponding to the measurement in a similar way to above.

In that case, $$Y_k \approx h(\hat{X}_{k|k-1}) + C_k(X_k - \hat{X}_{k|k-1}) + W_k \quad (30)$$

$$\hat{Y}_{k|k-1} \approx h(\hat{X}_{k-1}) \quad (31)$$

in accordance with (20). The posteriori covariance matrix is yielded from the Kalman gain equation, following from the orthogonality principle:

$$\Sigma_{k|k} \hat{=} \text{Cov}(X_k|Y_0, \ldots, Y_k) \approx (I - K_k C_k) \Sigma_{k|k-1}, \quad (32)$$

$$K_k \hat{=} \Sigma_{k|k-1} C_k^T (C_k \Sigma_{k|k-1} C_k^T + \Sigma_w)^{-1} \quad (33)$$

being the Kalman gain. The Gaussian approximation of the posteriori distribution of $X_k$ is, finally, $$p_{x_k|Y_0,\ldots,Y_k}(x_k|y_0,\ldots,y_k) \approx N(\hat{x}_{k|k}; \Sigma_{k|k}) \quad (34)$$

in which case, $$\hat{x}_{k|k} := \underset{\{x|g(x)=0\}}{\arg\min}(x - \hat{x}_{k|k-1})^T \Sigma_{k|k-1}^{-1}(x - \hat{x}_{k|k-1}) - \log p_w(y_k - h(x)). \quad (35)$$

The equation (35) signifies that $\hat{x}_{k|k}$ is a value of state x for which, under the boundary condition of g(x)=0, the value of $$(x - \hat{x}_{k|k-1})^T \Sigma_{k|k-1}^{-1}(x - \hat{x}_{k|k-1}) - \log p_w(y_k - h(x))$$

is a minimum.

Uncertainties are determined in the following way: let measurements $Y_0 = y_0, \ldots, Y_k = y_k$ be known. The function $P_{x_k|y_0,\ldots,y_k}(\cdot|y_0,\ldots,y_k)$ then contains all the information which is known at the instant k concerning the state $X_k$. For example, it follows that in the state space the ellipsoid $$\Gamma \hat{=} \{x|(x - \hat{x}_{k|k})^T \Sigma_{k|k}^{-1}(-\hat{x}_{k|k}) \leq \gamma_a\} \, 0 < \alpha < 1 \quad (36)$$

contains the value $X_k$ with the—approximate—probability $\alpha$, that is to say $$P(X_k \in \Gamma | Y_0 = y_0, \ldots, y_k) \approx \alpha.$$

In (36), $\gamma_a$ is a solution of the implicit equation $$\int_\Gamma \exp\left[-(x-\hat{x}_{k|k})^T \sum_{k|k}^{-1} (x-\hat{x}_{k|k})/2\right] dx = \left((2\pi)^d \left|\sum_{k|k}\right|\right)^{1/2} \alpha.$$

Put more simply, the uncertainty can be integrated for each state variable. For example, let the ith state variable be considered at the instant k. Given the measurements $y_0, \ldots, y_k$, the interval in which $(X_k)_i$ is situated with a probability of, for example, 0.95, is determined from (34) as $$[(\hat{x}_{k|k})_i - 2(\Sigma_{k|k})_i^{1/2}, (\hat{x}_{k|k})_i + 2(\Sigma_{k|k})_i^{1/2}], \quad (37)$$

that is to say it holds that $$P(|(X_k)_i - (\hat{x}_{k|k})_i| \leq 2(\Sigma_{k|k})_i^{1/2}|Y_0=y_0, \ldots, Y_k=y_k) \approx 2\,erf(2) \approx 0.95$$

It is to be borne in mind that (37) is not equivalent to a confidence interval, since generally $\Sigma_{k|k}$ (32) is not equal to the covariance of the state estimator $\mathrm{Cov}(\hat{X}_{k|k}|X_k)$ In order to reduce the computational outlay in the method described above, accuracy matrices are introduced as a measure of accuracy, and the matrix inversion lemma is applied. This is done in the following way:

An accuracy matrix is defined as the inverse of a covariance matrix. The matrix inversion lemma states that $$(A+BCD)^{-1} = A^{-1} - A^{-1}B(C^{-1}+DA^{-1}B)^{-1}DA^{-1}, \quad (38)$$

holds, on the assumption that the inverses exist. It then follows that $$\left(C_k \sum_{k|k-1} C_k^T + \sum_w\right)^{-1} = \sum_w^{-1} - \sum_w^{-1} C_k \left(\sum_{k|k-1}^{-1} + C_k^T \sum_w^{-1} C_k\right)^{-1} C_k^T \sum_w^{-1}. \quad (39)$$

Upon incorporating (33) and inverting (32), the result is $$\sum_{k|k}^{-1} = \sum_{k|k-1}^{-1} + C_k^T \sum_w^{-1} C_k. \quad (40)$$

On the other hand, the inversion of (27) yields $$\sum_{k+1|k}^{-1} = \sum_v^{-1} - \sum_v^{-1} A_k \left(\sum_{k|k}^{-1} + A_k^T \sum_v^{-1} A_k\right)^{-1} A_k^T \sum_v^{-1}. \quad (41)$$

Finally, it is established that the MAP estimate (35) is already expressed as a function of the accuracy matrix $\Sigma_{k|k-1}^{-1}$. Consequently, only an explicit matrix inversion is required in (41). Usually, the number m=dim(y) of measuring signals is greater than the number d=dim(x) of state variables, since the measurements are redundant. The matrix with (d×d) to be inverted in (41) is substantially smaller than (m×m) in (33).

Figure 3:
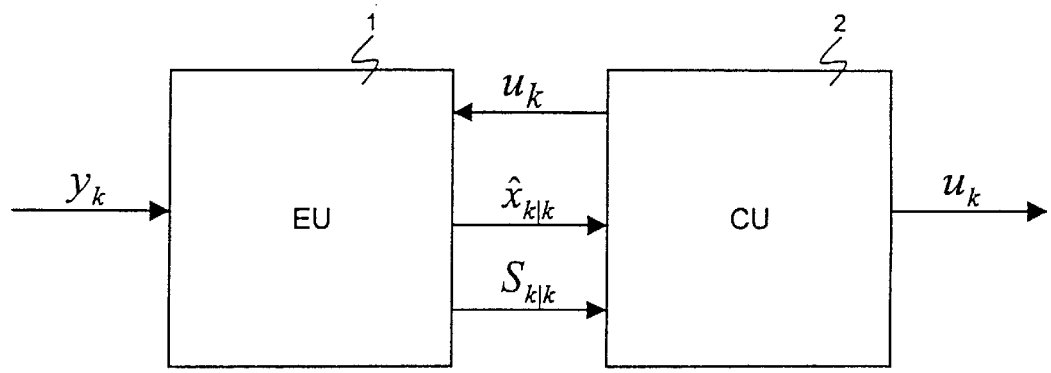
Figure 4:
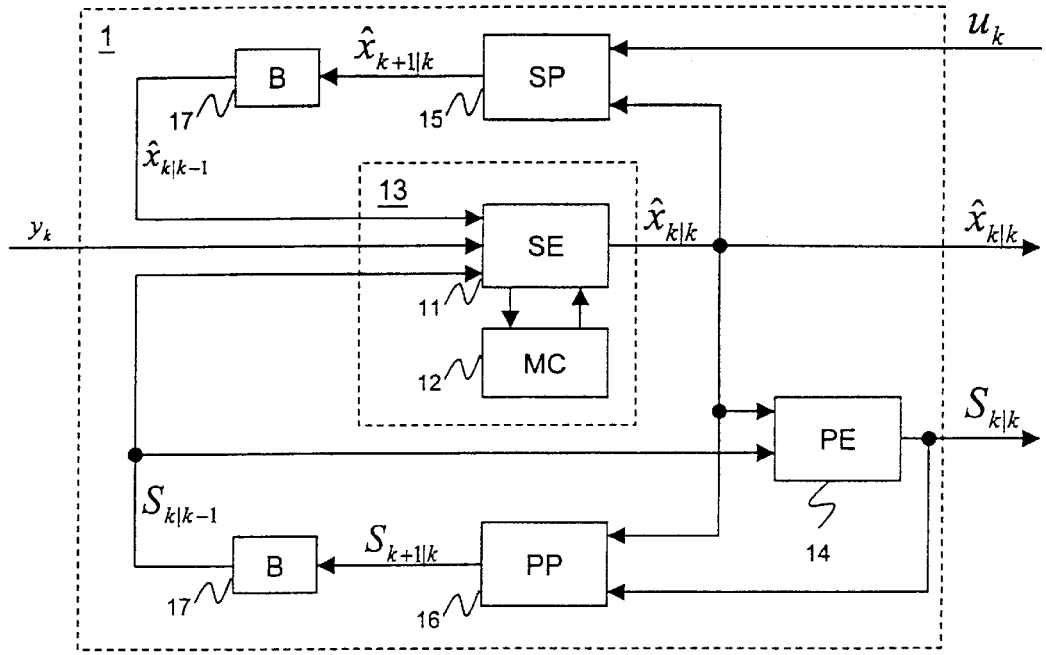
Figure 5:
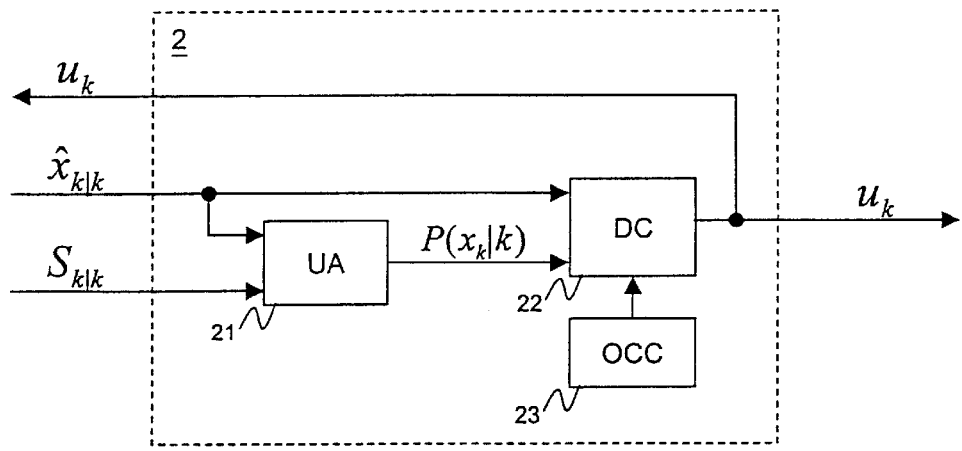

FIG. 3 shows a device according to the invention. It comprises an estimator unit 1 and a control unit 2. FIG. 4 shows the estimator unit 1, FIG. 5 the control unit 2. The estimator unit 1 has a consistent state estimator 13, an accuracy estimator 14, a state predictor 15, an accuracy predictor 16 and two buffers 17.

The consistent state estimator has a state estimator 11 which is coupled to boundary conditions 12 which represent, for example, the physical conservation conditions or balances. The control unit 2 has an uncertainty determiner 21, a controller/regulator 22 and an operating costs definer 23. The estimator unit 1 is coupled to a system by a measuring connection for transmitting measuring signals y. The control unit is coupled to the system by a control connection for transmitting actuating signals u.

A system is to be understood as a technical process of arbitrary type, for example a production engineering plant, an electromechanical device or a plant for generating energy, in particular a thermal power plant for generating electric energy.

The device according to the invention operates cyclically, the following method steps being carried out in a cycle with the index k:

The state estimator 11 estimates a most probable current state $\hat{x}_{k|k}$ of the system, given the boundary conditions 12, current measured values $y_k$ and predicted states $\hat{x}_{k|k-1}$ and/or accuracies $S_{k|k-1}$, stored in buffers 17 and determined in the last cycle in the state predictor 15 and in the accuracy predictor 16. The most probable state is that which satisfies the boundary conditions 12, that is to say $g(\hat{x}_{k|k})=0$, and simultaneously minimizes a combination of two deviations. The first of these deviations is a deviation of the state from the predicted state, weighted with the accuracy of this state prediction. The second of these deviations is the deviation of measurements, consistent with the state, from the actual measurements, weighted with the accuracy of the measurements. The accuracy of the measurements can have been adapted continuously in the process, or else have been assumed as constant.

The accuracy estimator 14 determines an accuracy $S_{k|k}$ of the estimated state from the accuracy $S_{k|k-1}$ of the state predicted in the last cycle, as well as from the current estimated state $\hat{x}_k$ k. The new accuracy $S_{k|k}$ is equal to the last accuracy $S_{k|k-1}$, enlarged by the accuracy obtained by the new measurements.

The state predictor 15 determines a most probable value $\hat{x}_{k+1|k}$ of the state in the next cycle from the current state estimate $\hat{x}_{k|k}$ and the actuating signals $U_k$. A model of the system dynamics is used for this purpose.

The accuracy predictor 16 determines an accuracy $S_{k+1|k}$ of a prediction. These accuracies can cover each of the states and measurements, or else only one of the states. They are determined by the current accuracies $S_{k|k}$ and the current state estimate $\hat{X}_{k|k}$. The accuracy $S_{k+1|k}$ of the prediction $\hat{x}k_{+1|k}$ corresponds to the current accuracy $S_{k|k}$, reduced by an uncertainty in the modeling of the system performance.

The uncertainty determiner (21) determines the probability distribution $p(x_{k|k})$ of the current state x from the state estimate $\hat{x}_{k|k}$ as well as from the current accuracy $S_{k|k}$. The uncertainty determiner 21 further also determines probability intervals containing the state variables with a prescribed probability.

The controller/regulator 22 determines manipulated variables $u_k$ from the current state estimate $\hat{x}_{k|k}$ as well as from their uncertainties. For example, the probabilities of the states to be expected are determined for various scenarios, that is to say for various profiles of manipulated variable. These probabilities are combined with state-dependent costs or risks from the operating costs definer 23, and probabilities of costs or risks are determined therefrom for various scenarios. Optimization with reference to these costs or risks yields the manipulated variables. The manipulated variables act on the system via actuators.

In a preferred variant of the method according to the invention, the following steps are carried out in the specified components.

The following are yielded assuming averageless Gaussian processes $\{W_k\}$ and $\{V_k\}$:

a state mapping f,
a set of boundary conditions g,
a measuring mapping h, an accuracy matrix $S_v = \Sigma_v^{-1}$ of the state noise, and an accuracy matrix $S_w = \Sigma_w^{-1}$ of the measuring noise.

These values are preferably determined with the aid of physical models and/or of measurements. The values of $S_v$ and/or $S_w$ are advantageously continuously adapted.

Step 0: the initialization of the method is setting k:=−1, determining the prior probability distribution of the initial state $X_0$ by selecting an a priori most probable value $\hat{x}_{0|-1}$, satisfying the boundary conditions $g(\hat{x}_{0|-1})=0$, and an accuracy matrix $S_{0|-1}$. In this case, $S_{0|-1}=\Sigma_{0|-1}^{-1}$ is advantageously selected as a diagonal matrix.

Step 1: For the new measurement, k:=k+1 is set, and $y_k$ is measured.

Step 2: Given the new measurement, in order to estimate the most probable state the minimization problem is solved under the boundary condition of $$\hat{x}_{k|k} := \underset{\{x|g(x)=0\}}{argmin}(x-\hat{x}_{k|k-1})^T S_{k|k-1}(x-\hat{x}_{k|k-1}) + (y_k - h(x))^T S_W (y_k - h(x))$$

in accordance with (35) in the consistent state estimator 13. (The right-hand term in the above expression is yielded by the corresponding term of (35) under the above assumption of Gaussian processes.)

For a numerical minimization, $x=\hat{x}_{k|k-1}$, for example, is elected as initial condition. Conjugate gradient minimization, Gauss-Newton minimization or stochastic optimization methods, for example, are suitable, for the use of Lagrange multipliers, as minimization methods. The resulting estimate $\hat{x}_{k|k}$ is consistent with the model, that is to say it satisfies $g(\hat{x}_{k|k})=0$.

Step 3: In order to determine the accuracy of the estimate, $C_k := \nabla h(\hat{x}_{k|k})$ and $S_{k|k} := S_{k|k-1} + C_k^T S_w C_k$ are determined in the accuracy estimator 14 in accordance with (29) and (40), respectively.

Given the last measurement as well as all the earlier measurements, the distribution of the state $X_k$ is approximately Gaussian, with the mean value $\hat{x}_{k|k}$ and the accuracy matrix $S_{k|k}$.

Step 4: Taking account of the operating costs definer 23, manipulated variables $u_k$ are determined and output in the controler/regulator 22. This step is optional and is carried out only if the state estimation is connected to a regulator.

Step 5: In order to predict the state in the next cycle, $\hat{x}_{k+1|k} := f(\hat{x}_{k|k}, u_k)$ is determined in the state predictor 15 in accordance with (26).

Step 6: In order to estimate the accuracies of the prediction in accordance with Step 5, $A_k := \nabla f(\hat{x}_{k|k}, u_k)$, $Q_k := (S_{k|k} + A_k^T S_v A_k)^{-1}$ and $S_{k+1|k} := S_v - S_v A_k Q_k (S_v A_k)^T$ are determined in the accuracy predictor 16 in accordance with (25) and (41).

Step 7: In order to determine probability intervals, a 95% interval for $(X_k)_i$, for example, is determined in accordance with (37) as $$(\hat{x}_{k|k})_i \pm \frac{2}{\sqrt{(S_{k|k})_i}}$$

in the uncertainty determiner 21. This step is optional and is advantageously carried out only if the state estimation is connected to a regulator.

In an advantageous variant of the method according to the invention, unknown parameters, for example covariances or accuracies, are considered as additional states. In particular, a parameter $\theta$, which is assumed to be constant, is considered as the jth time invariant state $(x)_j=\theta$. That is to say, the state mapping f satisfies the equation $$(f(x,u))_j = (x)_j$$

for all x and u. In this case, the corresponding elements of the gradient of f at any instant k are $$\begin{cases} (A_k)_{ij} = (A_k)_{ji} = 0 & \text{for all } i \neq j \\ (A_k)_{jj} = 1 \end{cases}$$

Furthermore, the covariance of the state disturbances satisfies $$(\Sigma_v)_{ij} = (\Sigma_v)_{ji} = 0 \text{ for all } i.$$

The method indicated above is used to obtain a recursive estimate of the constants $\theta$ on the basis of the measurements $y_0, \ldots, y_k$. The variance of the estimate will decrease monotonically with increasing k, that is to say its accuracy will increase continuously.

The method according to the invention and the device therefore permit the state of a technical system to be estimated, account also being taken, in addition to static physical boundary conditions, of system dynamics and the information on the accuracy or the uncertainty of the estimate. As a result, there is an improvement in the quality of the estimate and in any regulation/control based thereon.

In a preferred variant of the invention, it is used to observe and/or control an industrial production process or a power plant, in particular a combined cycle power plant. Measured values are, for example, pressures, temperatures, mass flows, voltages, currents, densities or velocities.

Physical boundary conditions are, for example, given by conservation laws for mass, energy or momentum, or by mechanically induced geometrical restrictions on the spatial position of objects.

List of Reference Symbols

1 Estimator unit (EU)
2 Control unit (CU)
11 State estimator (SE)
12 Boundary conditions (MC)
13 Consistent state estimator
14 Accuracy-estimator (PE)
15 State predictor (SP)
16 Accuracy predictor (PP)
17 Buffer (B)
21 Uncertainty determiner (UA)
22 Controller/regulator (DC)
23 Operating costs definer (OCC)
S Accuracy
u,U Manipulated variables
V Process noise
W Measuring noise
x,X State x̂,X̂ Estimated state
y,Y Measured values

What is claimed is:

1. A method for estimating a state of a system, the method being carried out cyclically and comprising:
   using a cycle state estimator to determine an estimated state of the system based on measured values of the system, physical boundary conditions of the system, and a measure of the accuracy of the measured values, wherein, for purposes of determining the estimated state, the state estimator takes account of an estimated state from a preceding cycle;
   using an accuracy estimator to determine a measure of the accuracy of the estimated state; and
   using an uncertainty determiner to determine an uncertainty of the estimated state based on the estimated state and the accuracy of the estimated state.

2. The method according to claim 1, wherein determining the estimated state of the system is also based on an accuracy of the estimated state from the preceding cycle.

3. The method according to claim 1, wherein the estimated state is determined based on the following equation:

$$\hat{x}_{k|k} := \underset{\{x|g(x)=0\}}{\operatorname{argmin}}(x - \hat{x}_{k|k-1})^T S_{k|k-1}(x - \hat{x}_{k|k-1}) + (y_k - h(x))^T S_w(y_k - h(x))$$

under the boundary condition of:

$g(\hat{x}_{k|k})=0$, where
   $\hat{x}_{k|k}$ is the estimated vector state, at a kth instant based on the measured values which contain up to and including the kth instant,
   $\hat{x}_{k|k-1}$ is an estimated state at the kth instant based on the measured values which obtain up to and including a (k−1)th instant,
   $S_{k|k-1}$ is an accuracy matrix corresponding to an inverse covariance matrix, of the estimated state at the kth instant based on the measured values which obtain up to and including the (k−1)th instant,
   $y_k$ is a value of a vector of the measured values at the kth instant,
   h(x) is a vector function which determines a non-noisy output of the system from the state x, and
   $S_w = \Sigma_w^{-1}$ is an accuracy matrix of an instance of measuring noise, corresponding to an inverse of a covariance matrix of the measuring noise.

4. The method according to claim 1, further comprising:
   predicting the current state based on the estimated state from the preceding cycle and from preceding actuating signals.

5. The method according to claim 1, wherein the accuracy of the estimated state is determined from an accuracy predicted in the last cycle, and from a current state by calculating:

$C_k := \nabla h(\hat{x}_{k|k})$, and $S_{k|k} := S_{k|k-1} + C_k^T S_w C_k$, where
   $S_{k|k}$ is an accuracy matrix corresponding to an inverse covariance matrix of the estimated state at a kth instant, based on the measured values which obtain up to and including a kth instant,
   $\hat{x}_{k|k}$ is an estimated state at the kth instant, based on the measured values which obtain up to and including the kth instant,
   h(x) is a vector function which determines a non-noisy output of the system from the state x,
   $C_k$ is a matrix of the partial derivatives of the vector function corresponding to the Hesse matrix of h at the point $(\hat{x}_{k|k})$, $$S_w = \sum_w^{-1}$$

is an accuracy matrix of an instance of measuring noise corresponding to the inverse of a covariance matrix of the instance of the measuring noise, and
   $S_{k|k-1}$ is an accuracy matrix corresponding to an inverse covariance matrix of the estimated state at the kth instant, based on the measured values which obtain up to and including the (k−1)th instant.

6. The method according to claim 1, wherein the uncertainty of the estimated state is performed by determining a 95% probability interval for an estimated state $\hat{x}_{k|k}$ as:

$$(\hat{x}_{k|k})_i \pm \frac{2}{\sqrt{(S_{k|k})_i}}$$

where
   $S_{k|k}$ is an accuracy matrix corresponding to an inverse covariance matrix of the estimated state at the kth instant, based on the measured values which obtain up to and including a kth instant,
   $(\hat{x}_{k|k})_i$ denotes an ith element of the state vector $\hat{x}_{k|k}$, and
   $(S_{k|k})_i$ denotes an ith diagonal element of the accuracy matrix $S_{k|k}$.

7. The method according to claim 1, further comprising:
   estimating values of unknown parameters of the system including at least one of measures of accuracy or covariances.

8. The method according to claim 2, further comprising:
   determining an accuracy of a prediction of the estimated state from the preceding cycle to determine the estimated state from the preceding cycle.

9. The method according to claim 4, wherein the prediction step predicts a most probable value $\hat{x}_{k+1|k}$ of the current state at a (k+1)th instant by calculating:

$\hat{x}_{k+1|k} := f(\hat{x}_{k|k}, u_k)$ where $f(x_k, u_k)$ is a state mapping which uses a state $x_k$ and an input $u_k$ of the system at a kth instant to determine a state $x_{k+1}$ at succeeding (k+1)th instant.

10. The method according to claim 8, wherein the accuracy of the prediction of the estimated state from the preceding cycle is performed by calculating:

$A_k := \nabla f(\hat{x}_{k|k}, u_k)$, $Q_k := (S_{k|k} + A_k^T S_v A_k)^{-1}$, and $S_{k+1|k} := S_v - S_v A_k Q_k (S_v A_k)^T$, where
   $S_{k+1|k}$ is an accuracy matrix corresponding to an inverse covariance matrix of the estimated state at a (k+1)th instant, based on the measured values which obtain up to and including a kth instant,
   $\hat{x}_{k|k}$ is an estimated state at the kth instant based the measured values which obtain up to and including the kth instant, $f(x_k,u_k)$ is a state mapping which determines from a state $x_k$ and an input $u_k$ of the system at the kth instant a state $x_{k+1}$ at the succeeding (k+1)th instant, $A_k$ is a matrix of the partial derivatives of said state mapping corresponding to the Hesse matrix of at the point $(\hat{x}_{k|k}, u_k)$, $S_v = \Sigma_v^{-1}$ is an accuracy matrix of an instance of process noise corresponding to an inverse of a covariance matrix of the instance of the process noise, and $S_{k|k}$ is an accuracy matrix corresponding to an inverse covariance matrix of the estimated state at the kth instant, based on the measured values which obtain up to and including the kth instant.

11. A device for estimating a state of a system by carrying out a cyclical method, comprising:

a state estimator configured to determine, an estimated state of the system based on measured values of the system, physical boundary conditions of the system, and a measure of the accuracy of the currently measured values, wherein, for purposes of determining the estimated state, the state estimator takes account of an estimated state from a preceding cycle;

an accuracy estimator configured to determine an accuracy of the estimated state; and an uncertainty determiner configured to determine an uncertainty of the estimated state based on the estimated state and the accuracy of the estimated state.

12. The device according to claim 11, wherein the state estimator also determines the estimated state of the system based on an accuracy of the estimated state from the preceding cycle.

13. The device according to claim 11, wherein the state estimator determined the estimated state based on the following equation:

$$\hat{x}_{k|k} := \underset{\{x|g(x)=0\}}{\operatorname{argmin}}(x - \hat{x}_{k|k-1})^T S_{k|k-1}(x - \hat{x}_{k|k-1}) + (y_k - h(x))^T S_w(y_k - h(x))$$

under the boundary condition of:

$g(\hat{x}_{k|k})=0$, where $\hat{x}_{k|k}$ is the estimated vector state, at a kth instant based on the measured values which contain up to and including the kth instant, $\hat{x}_{k|k-1}$ is an estimated state at the kth instant based on the measured values which obtain up to and including a (k−1)th instant, $S_{k|k-1}$ is an accuracy matrix corresponding to an inverse covariance matrix, of the estimated state at the kth instant based on the measured values which obtain up to and including the (k−1)th instant, $y_k$ is a value of a vector of the measured values at the kth instant, h(x) is a vector function which determines a non-noisy output of the system from the state x, and $S_w = \Sigma_w^{-1}$ is an accuracy matrix of an instance of measuring noise, corresponding to an inverse of a covariance matrix of the measuring noise.

14. The device according to claim 11, further comprising:

a state predictor configured to predict the current state based on the estimated state from the preceding cycle and from preceding actuating signals.

15. The device according to claim 11, wherein the accuracy estimator determines the accuracy of the estimated state from an accuracy predicted in the last cycle, and from a current state by calculating:

$C_k := \nabla h(\hat{x}_{k|k})$, and $S_{k|k} := S_{k|k-1} + C_k^T S_w C_k$, where $S_{k|k}$ is an accuracy matrix corresponding to an inverse covariance matrix of the estimated state at a kth instant, based on the measured values which obtain up to and including a kth instant, $\hat{x}_{k|k}$ is an estimated state at the kth instant, based on the measured values which obtain up to and including the kth instant, h(x) is a vector function which determines a non-noisy output of the system from the state x, $C_k$ is a matrix of the partial derivatives of the vector function corresponding to the Hesse matrix of h at the point $(\hat{x}_{k|k})$, $S_w = \Sigma_w^{-1}$ is an accuracy matrix of an instance of measuring noise corresponding to the inverse of a covariance matrix of the instance of the measuring noise, and $S_{k|k-1}$ is an accuracy matrix corresponding to an inverse covariance matrix of the estimated state at the kth instant, based on the measured values which obtain up to and including the (k−1)th instant.

16. The device according to claim 11, wherein the uncertainty determiner determines the uncertainty of the estimated state by determining a 95% probability interval for an estimated state of $\hat{x}_{k|k}$ as:

$$(\hat{x}_{k|k})_i \pm \frac{2}{\sqrt{(S_{k|k})_i}}$$

where $S_{k|k}$ is an accuracy matrix corresponding to an inverse covariance matrix of the estimated state at the kth instant, based on the measured values which obtain up to and including a kth instant, $(\hat{x}_{k|k})_i$ denotes an ith element of the state vector $\hat{x}_{k|k}$, and $(S_{k|k})_i$ denotes an ith diagonal element of the accuracy matrix $S_{k|k}$.

17. The device according to claim 12, further comprising:

an accuracy predictor configured to determine an accuracy of a prediction of the estimated state from the preceding cycle to determine the estimated state from the preceding cycle.

18. The device according to claim 14, wherein the state predictor predicts a most probable value $\hat{x}_{k+1|k}$ of the current state at a (k+1)th instant by calculating:

$\hat{x}_{k+1|k} := f(\hat{x}_{k|k}, u_k)$ where $f(x_k, u_k)$ is a state mapping which uses a state $x_k$ and an input $u_k$ of the system at a kth instant to determine a state $x_{k+1}$ at succeeding (k+1)th instant.

19. The device according to claim 17, wherein the accuracy of the prediction of the estimated state from the preceding cycle is performed by calculating:

$A_k := \nabla f(\hat{x}_{k|k}, u_k)$, $Q_k := (S_{k|k} + A_k^T S_v A_k)^{-1}$ and $S_{k+1|k} := S_v - S_v A_k Q_k (S_v A_k)^T$, where
- $S_{k+1|k}$ is an accuracy matrix corresponding to an inverse covariance matrix of the estimated state at a (k+1)th instant, based on the measured values which obtain up to and including a kth instant,
- $\hat{x}_{k|k}$ is an estimated state at the kth instant based the measured values which obtain up to and including the kth instant,
- $f(x_k, u_k)$ is a state mapping which determines from a state $x_k$ and an input $u_k$ of the system at the kth instant a state $x_{k+1}$ at the succeeding (k+1)th instant,
- $A_k$ is a matrix of the partial derivatives of said state mapping corresponding to the Hesse matrix of at the point $\hat{x}_{k|k}, u_k$),
- $S_v = \Sigma_v^{-1}$ is an accuracy matrix of an instance of process noise corresponding to an inverse of a covariance matrix of the instance of the process noise, and
- $S_{k|k}$ is an accuracy matrix corresponding to an inverse covariance matrix of the estimated state at the kth instant, based on the measured values which obtain up to and including the kth instant.

20. A system for estimating a state of a system by carrying out a cyclical method, comprising:
- means for determining, an estimated state of the system based on measured values of the system, physical boundary conditions of the system, and a measure of the accuracy of the currently measured values, wherein, for purposes of determining the estimated state, the means for determining an estimated state takes account of an estimated state from a preceding cycle;
- means for determining an accuracy of the estimated state; and
- means for determining an uncertainty of the estimated state based on the estimated state and the accuracy of the estimated state.

21. The system according to claim 20, wherein the means for determining the estimated state of the system also uses an accuracy of the estimated state from the preceding cycle.

22. The system according to claim 20, wherein the estimated state is determined based on the following equation:

$$\hat{x}_{k|k} := \underset{\{x | g(x) = 0\}}{\operatorname{argmin}} (x - \hat{x}_{k|k-1})^T S_{k|k-1} (x - \hat{x}_{k|k-1}) + (y_k - h(x))^T S_w (y_k - h(x))$$

under the boundary condition of:

$$g(\hat{x}_{k|k}) = 0,$$

where
- $\hat{x}_{k|k}$ is the estimated vector state, at a kth instant based on the measured values which contain up to and including the kth instant,
- $\hat{x}_{k|k-1}$ is an estimated state at the kth instant based on the measured values which obtain up to and including a (k−1)th instant,
- $S_{k|k-1}$ is an accuracy matrix corresponding to an inverse covariance matrix, of the estimated state at the kth instant based on the measured values which obtain up to and including the (k−1)th instant,
- $y_k$ is a value of a vector of the measured values at the kth instant,
- $h(x)$ is a vector function which determines a non-noisy output of the system from the state x, and
- $S_w = \Sigma_w^{-1}$ is an accuracy matrix of an instance of measuring noise, corresponding to an inverse of a covariance matrix of the measuring noise.

23. The system according to claim 20, further comprising:
means for predicting the current state based on the estimated state from the preceding cycle and from preceding actuating signals.

24. The system according to claim 20, wherein the accuracy of the estimated state is determined from an accuracy predicted in the last cycle, and from a current state by calculating:

$$C_k := \nabla h(\hat{x}_{k|k}), \text{ and}$$

$$S_{k|k} := S_{k|k-1} + C_k^T S_w C_k,$$

where
- $S_{k|k}$ is an accuracy matrix to an inverse covariance matrix of the estimated state at a kth instant, based on the measured value which obtain up to and including a kth instant,
- $\hat{x}_{k|k}$ is an estimated state at the kth instant, based on the measured values which obtain up to and including the kth instant,
- $h(x)$ is a vector function which determines a non-noisy output of the system from the state x,
- $C_k$ is a matrix of the partial derivatives of the vector function corresponding to the Hesse matrix of h at the point $(\hat{x}_{k|k})$, $$S_w = \sum_w^{-1}$$

is an accuracy matrix of an instance of measuring noise corresponding to the inverse of a covariance matrix of the instance of the measuring noise, and
- $S_{k|k-1}$ is an accuracy matrix corresponding to an inverse covariance matrix of the estimated state at the kth instant, based on the mesaured values which obtain up to and including the (k−1)th instant.

25. The system according to claim 20, wherein the uncertainty of the estimated state is preformed by determining a 95% probability interval for an estimated state $\hat{x}_{k|k}$ as:

$$(\hat{x}_{k|k})_i \pm \frac{2}{\sqrt{(S_{k|k})_i}}$$

where
- $S_{k|k}$ is an accuracy matrix corresponding to an inverse covariance matrix of the estimated state at the kth instant, based on the measured values which obtain up to and including a kth instant,
- $(\hat{x}_{k|k})_i$ denotes an ith element of the state vector $\hat{x}_{k|k}$, and
- $(S_{k|k})_i$ denotes an ith diagonal element of the accuracy matrix $S_{k|k}$.

26. The system according to claim 20, further comprising:
means for estimating values of unknown parameters of the system including at least one of measures of accuracy or covariances.

27. The system according to claim 21, further comprising:
means for determining an accuracy of a prediction of the estimated state from the preceding cycle to determine the estimated state from the preceding cycle.

28. The system according to claim 23, wherein the prediction means predicts a most probable value $\hat{x}_{k+1|k}$ of the current state at a (k+1)th instant by calculating:

$$\hat{x}_{k+1|k} := f(\hat{x}_{k|k}, u_k)$$

where $f(x_k, u_k)$ is a state mapping which uses a state $x_k$ and an input $u_k$ of the system at a kth instant to determine a state $x_{k+1}$ at succeeding (k+1)th instant.

29. The system according to claim 27, wherein the accuracy of the prediction of the estimated state from the preceding cycle is performed by calculating:

$$A_k := \nabla f(\hat{x}_{k|k}, u_k),$$

$$Q_k := (S_{k|k} + A_k S_v A_k)^{-1}, \text{ and}$$

$$S_{k+1|k} := S_v - S_v A_k Q_k (S_v A_k)^T,$$

where $S_{k+1|k}$ is an accuracy matrix corresponding to an inverse covariance matrix of the estimated state at a (k+1)th instant, based on the measured values which obtain up to and including a kth instant, $\hat{x}_{k|k}$ is an estimated state at the kth instant based the measured values which obtain up to and including the kth instant, $f(x_k, u_k)$ is a state mapping which determines from a state $x_k$ and an input $u_k$ of the system at the kth instant a state $x_{k+1}$ at the succeeding (k+1)th instant, $A_k$ is a matrix of the partial derivatives of said state mapping corresponding to the Hesse matrix of at the point $\hat{x}_{k|k}, u_k$), $S_v = \Sigma_v^{-1}$ is an accuracy matrix of an instance of process noise corresponding to an inverse of a covariance matrix of the instance of the process noise, and $S_{k|k}$ is an accuracy matrix corresponding to an inverse covariance matrix of the estimated state at the kth instant, based on the measured values which obtain up to and including the kth instant.

* * * * *